United States Patent [19]

Sasaki

[11] Patent Number: 5,795,449
[45] Date of Patent: Aug. 18, 1998

[54] PROCESSING-LIQUID RESERVATION UNIT FOR DISCHARGE PROCESSING APPARATUS

[75] Inventor: Tsutomu Sasaki, Tokyo, Japan

[73] Assignee: Mitsubishi Denki Kabushiki Kaisha, Tokyo, Japan

[21] Appl. No.: 758,459

[22] Filed: Nov. 29, 1996

[30] Foreign Application Priority Data

Apr. 18, 1996 [JP] Japan .................................. 8-097169

[51] Int. Cl.$^6$ .................. B23H 1/00; B23H 3/00; B23H 11/00
[52] U.S. Cl. .................. 204/224 M; 204/279; 204/277; 204/278; 219/69.11; 219/69.14
[58] Field of Search .................. 204/224 M, 279; 219/69.11, 69.18, 69.14

[56] References Cited

U.S. PATENT DOCUMENTS

| | | | |
|---|---|---|---|
| 5,036,173 | 7/1991 | Wilson | 219/69.11 |
| 5,270,512 | 12/1993 | Onandia | 219/69.11 |
| 5,290,987 | 3/1994 | Davis et al. | 219/69.11 |
| 5,565,115 | 10/1996 | Derighetti | 219/69.11 |

*Primary Examiner*—Donald R. Valentine
*Attorney, Agent, or Firm*—Sughrue, Mion, Zinn, Macpeak & Seas, PLLC

[57] ABSTRACT

A processing-liquid reservation unit for a discharge processing apparatus which reserves processing liquid supplied from a processing-liquid supply unit and generates, in the processing liquid, a discharge in a small gap between an electrode and a work piece to be processed so as to process the work piece, the processing-liquid reservation unit for a discharge processing apparatus comprising: a processing tank having an opening portion; a door for opening/closing the opening portion of the processing tank; a tubular elastic member for sealing a space between the door and the opening portion of the processing tank in a state where the door is closed; and a fluid control unit for filling the tubular elastic member with fluid and discharging the same from the tubular elastic member.

21 Claims, 9 Drawing Sheets

PROCESSING-LIQUID RESERVATION UNIT FOR DISCHARGE PROCESSING APPARATUS

BACKGROUND OF THE INVENTION

The present invention relates to a processing-liquid reservation unit for a discharge processing apparatus.

FIG. 16 is a diagram showing a conventional processing-liquid reservation unit for a discharge processing apparatus. Referring to FIG. 16, reference numeral 10 represents a base of the discharge processing apparatus, 12 represents a processing tank mounted on the base 10 and 14 represents a work table disposed in the processing tank. Symbol W represents a work piece secured to the upper surface of the work table 14. Reference numeral 15 represents an electrode and 16 represents a processing-liquid supply unit. Reference numeral 18 represents insulating processing liquid which is supplied into the processing tank from the processing-liquid supply unit 16 so as to be reserved so that the work piece W is immersed. Reference numeral 20 represents an opening portion provided for the processing tank 12 so as to facilitate disposition of the work piece W and the like. Reference numeral 22 represents a door for closing the opening portion 20, and 23 represents a fastening tool, such as a snap lock, for securing the door 22 to the processing tank 12.

FIG. 17 is a plan view of the processing-liquid reservation unit. Referring to FIG. 17, reference numeral 24 represents a sealing member made of, for example, rubber for preventing leakage of the processing liquid 18 and secured to the processing tank 12 or the door 22.

In a case where the processing liquid 1 is reserved, the opening portion 20 of the processing tank 12 is closed by the door 22, and the door 22 is, by the fastening tool 23, pushed against the processing tank to deform the sealing member 24. Thus, leakage of the processing liquid 18 is prevented and the processing liquid 18 is reserved.

The processing operation is performed in the processing tank 12 by supplying a pulse electric current from a power source (not shown) to the electrode 15 and the work piece W to generate discharge in a small gap between the electrode 15 and the work piece W through the processing liquid 18. The processing liquid 18 contaminated due to the process is restored by the processing-liquid supply unit 16, and then filtered by a filter or the like. Then, it is again circulated and supplied.

In the processing-liquid reservation unit of the foregoing type, in a case where the processing liquid 18 is reserved in the processing tank 12, the processing tank 12 and the door 22 are required to be brought into hermetically contact with each other by the plural fastening tools 23 through the sealing member 24 in order to prevent leakage of the processing liquid 18. To achieve this, the overall body of the sealing member 24 is required to be uniformly compressed. However, since only several points are fastened, the force for compressing the sealing member 24 is concentrated into the several points. Thus, each fastening point must bear excessively large force. To uniformly transmit the excessively large force concentrated to the several points to the overall body of the sealing member 24, the door 22 and the processing tank 12 are required to have sufficient rigidity to be free from deformation, such as distortion, which takes place due to the force concentrated to the several points. As a result, the costs of the processing tank 12 and the door 22 cannot be reduced.

In a case where a mechanical fastening unit is employed, a difficulty arises in automating the operation for opening/closing the door 22. What is worse, an error in operation performed by an operator or the like results in erroneous loosening being taken place. Thus, leakage of the processing liquid 18 to the outside of the processing tank cannot be prevented.

SUMMARY OF THE INVENTION

The present invention was found to solve the foregoing problems and there is provided an apparatus which is capable of restraining the rigidity of the processing tank 12 and the door 22, reducing the cost, adaptable to automatization and preventing leakage of the processing liquid 18 to the outside of the processing tank.

A processing-liquid reservation unit for a discharge processing apparatus according to a first aspect of the present invention has a structure such that a processing-liquid reservation unit for a discharge processing apparatus which reserves processing liquid supplied from a processing-liquid supply unit and generates, in the processing liquid, a discharge in a small gap between an electrode and a work piece to be processed so as to process the work piece, comprises: a processing tank having an opening portion; a door for opening/closing the opening portion of the processing tank; a tubular elastic member for sealing a space between the door and the opening portion of the processing tank in a state where the door is closed; and a fluid control unit for filling the tubular elastic member with fluid and discharging the same from the tubular elastic member.

A processing-liquid reservation unit for a discharge processing apparatus according to a second aspect of the present invention has a structure such that a processing-liquid reservation unit for a discharge processing apparatus according to the first aspect has an arrangement such that the tubular elastic member is disposed to cause the door to press against the processing tank when the tubular elastic member is filled with the fluid and thus expanded.

A processing-liquid reservation unit for a discharge processing apparatus according to a third aspect of the present invention has a structure such that a processing-liquid reservation unit for a discharge processing apparatus according to the second aspect has an arrangement such that the fluid control unit has a check valve, a filling circuit capable of filling the tubular elastic member with the fluid only when electric power is supplied and a discharge circuit capable of discharging the fluid to the outside of the tubular elastic member only when electric power is supplied.

A processing-liquid reservation unit for a discharge processing apparatus according to a fourth aspect of the present invention has a structure such that a processing-liquid reservation unit for a discharge processing apparatus according to any one of the first to third aspects has an arrangement such that door-position detection means is provided which detects the position of the door to transmit a detection signal so that the fluid control unit is controlled in response to the detection signal.

A processing-liquid reservation unit for a discharge processing apparatus according to a fifth aspect of the present invention has a structure such that a processing-liquid reservation unit for a discharge processing apparatus according to any one of the first to third aspects has an arrangement such that state-detection means is provided which detects a state of expansion or state of compression of the tubular elastic member to transmit a detection signal so that the processing-liquid supply unit is controlled in response to the detection signal.

A processing-liquid reservation unit for a discharge processing apparatus according to a sixth aspect of the present invention has a structure such that a processing-liquid reservation unit for a discharge processing apparatus according to any one of the first to third aspects has an arrangement such that drive means for automatically opening/closing the door is provided so that the tubular elastic member is expanded or compressed when the processing tank is opened or closed so that the opening portion of the processing tank is operated.

A processing-liquid reservation unit for a discharge processing apparatus according to a seventh aspect of the present invention has a structure such that a processing-liquid reservation unit for a discharge processing apparatus according to any one of the first to third aspects has an arrangement such that liquid-level detection means is provided which detects whether or not the processing liquid exists in the processing tank, and in a case where the liquid-level detection means has determined that the processing liquid exists in the processing tank, the fluid cannot be discharged from the tubular elastic member.

A processing-liquid reservation unit for a discharge processing apparatus according to an eighth aspect of the present invention has a structure such that a processing-liquid reservation unit for a discharge processing apparatus according to any one of the first to third aspects has an arrangement such that discharge means for discharging the processing liquid in the processing tank is provided and the discharge means is operated when the power supply has been interrupted.

A processing-liquid reservation unit for a discharge processing apparatus according to a ninth aspect of the present invention has a structure such that a processing-liquid reservation unit for a discharge processing apparatus according to the eighth aspect has an arrangement such that pressure detection means is provided which detects the pressure of the fluid in the tubular elastic member and in a case where the pressure of the fluid in the tubular elastic member detected by the pressure detection means is lower than a certain level, the discharge means for discharging the processing liquid in the processing tank is operated.

DETAILED DESCRIPTION OF THE PREFERRED EMBODIMENTS (Embodiment 1)

Figure 1:
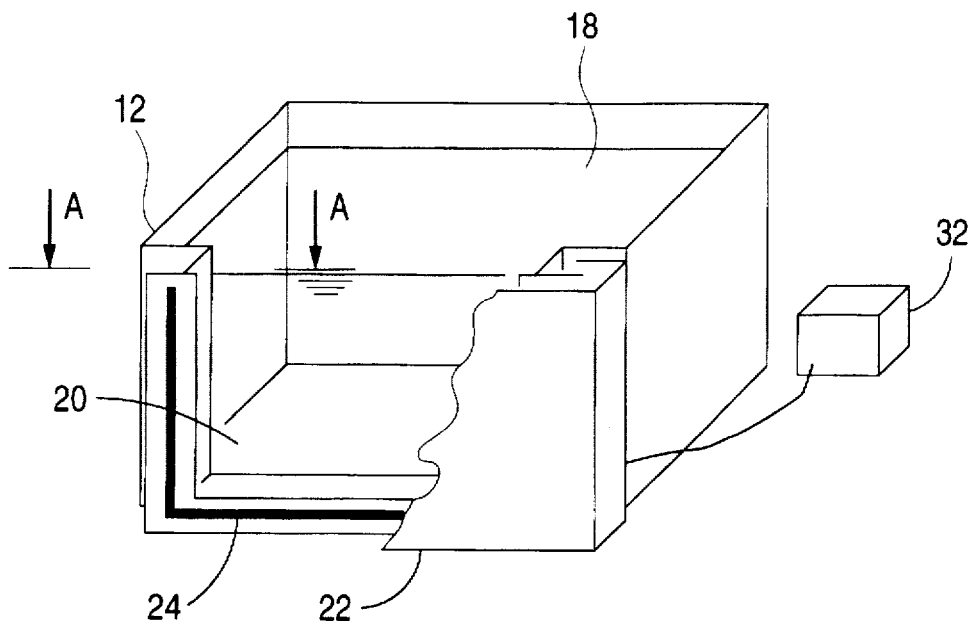
FIG. 1 is a perspective view showing the processing-liquid reservation unit according to the first embodiment.

FIG. 1 is a perspective view of a first embodiment of a processing-liquid reservation unit for a discharge processing apparatus according to the present invention. Referring to FIG. 1, reference numeral 12 represents a processing tank, 18 represents processing liquid to be reserved in the processing tank 12, 20 represents an opening portion provided for the processing tank 12, 22 represents a door attached to be capable of vertically moving along the front surface of the processing tank 12 to cover the opening portion 20, 24 represents a sealing member attached to the processing tank 12 to be placed along the opening portion 20, 30 represents a tubular elastic member attached to the processing tank 12 to be placed along the sealing member 24, and 32 represents a fluid supply means for supplying fluid to the tubular elastic member 30.

Figure 2:
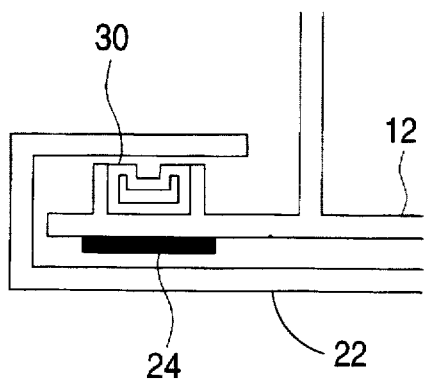
FIG. 2 is a cross sectional view showing the processing-liquid reservation unit according to the first embodiment.
Figure 3:
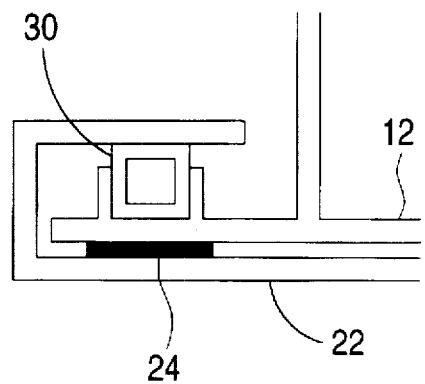
FIG. 3 is a cross sectional view showing the processing-liquid reservation unit according to the first embodiment.

FIGS. 2 and 3 are cross sectional views taken along line A—A shown in FIG. 1. FIG. 2 shows a state where the tubular elastic member 30 is not expanded, and FIG. 3 shows a state where the tubular elastic member 30 has been expanded.

The operation will now be described with reference to FIGS. 1, 2 and 3. When the tubular elastic member 30 is filled with the fluid by the fluid supply means 32, the tubular elastic member 30 is expanded to press the door 22 in a direction toward the processing tank (the upward direction in FIG. 2). Thus, the sealing member 24 is compressed to prevent leakage of the processing liquid 18 so that the processing liquid 18 is reserved.

(Embodiment 2)

Figure 4:
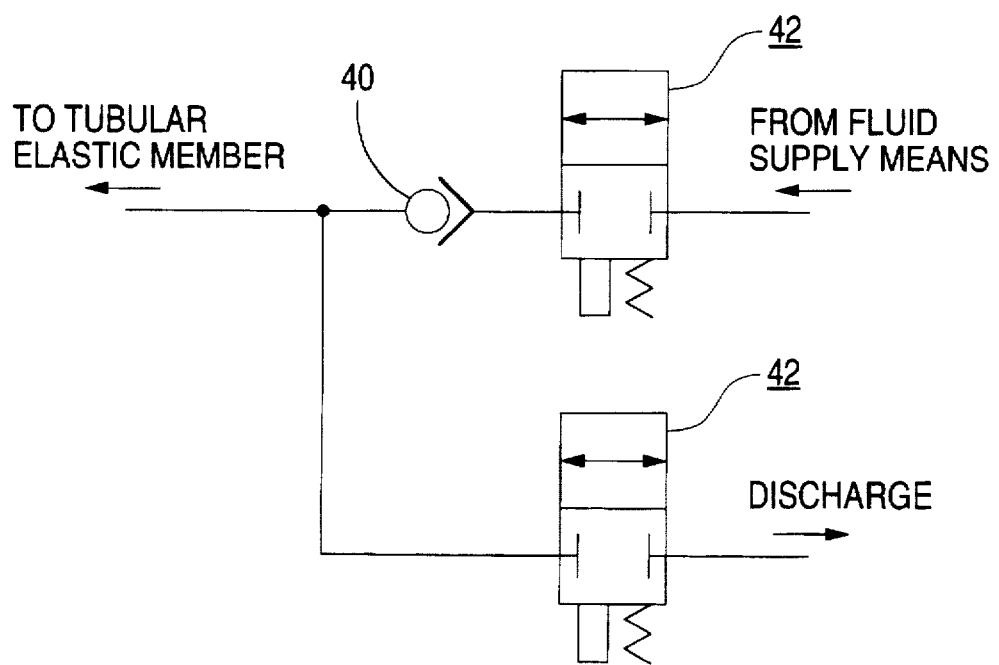
FIG. 4 is a circuit diagram for the fluid control unit of the processing-liquid reservation unit according to the second embodiment.

FIG. 4 is a circuit diagram showing an embodiment of a passage in a fluid control unit. Referring to FIG. 4, reference numeral 40 represents a check valve and 42 represents an electromagnetic valve for opening the passage only when electric power is supplied.

If power supply is interrupted during reservation of the processing liquid, the check valve 40 shown in FIG. 4 and the electromagnetic valve 42 for interrupting the circuit when no electric power is supplied prevent rapid leakage of the fluid. Thus, the reservation of the processing liquid 18 can be maintained. In a case where supply of the fluid is interrupted due to some reason during supply of electric power to a fluid filling circuit (during opening), the check valve 40 prevents a backflow of the fluid through the filling circuit. Thus, reservation of the processing liquid 18 can be maintained.

(Embodiment 3)

Figure 5:
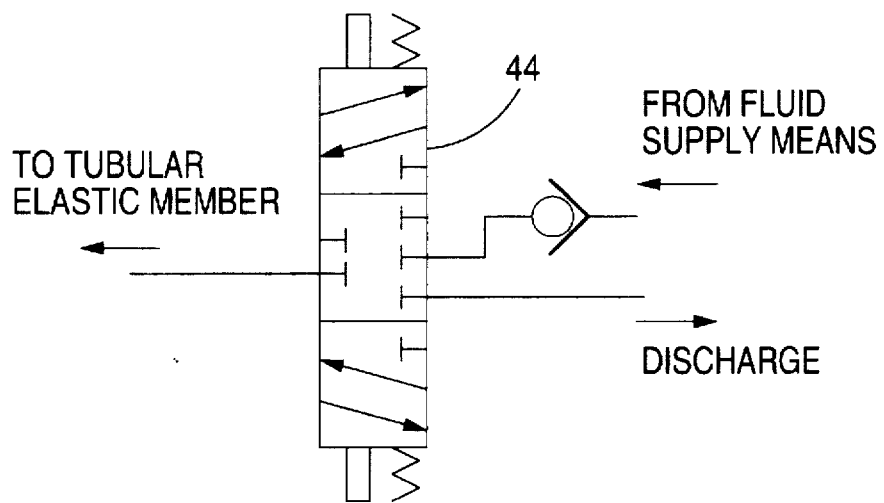
FIG. 5 is a circuit diagram for the fluid control unit of the processing-liquid reservation unit according to the third embodiment.

FIG. 5 shows another embodiment of a fluid passage. Referring to FIG. 5, reference numeral 44 represents an electromagnetic valve for opening the circuit only when electric power is supplied and closing the circuit when electric power is not supplied. Also this embodiment attains an effect similar to that obtainable from Embodiment 2.

(Embodiment 4)

Figure 6:
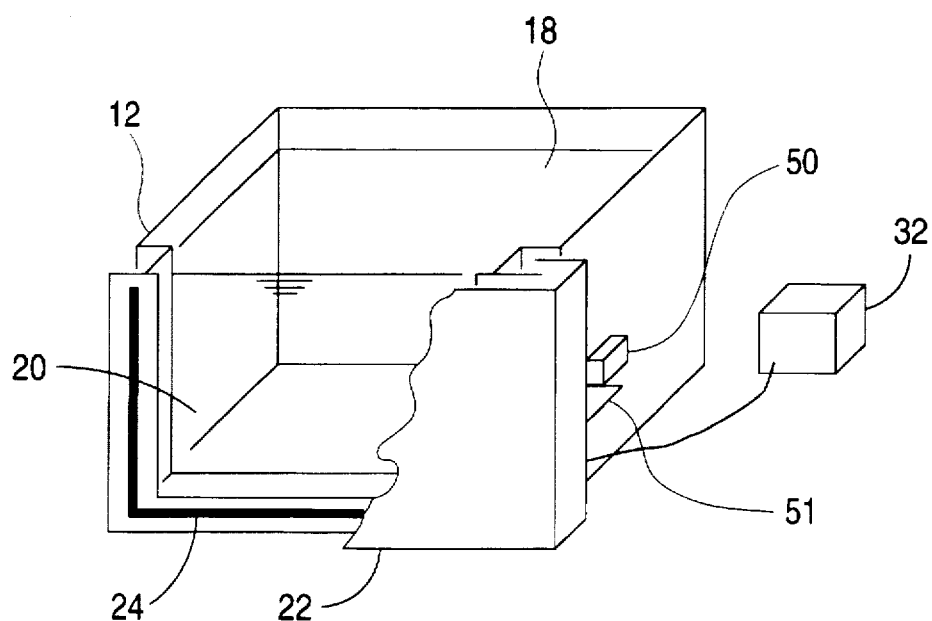
FIG. 6 is a perspective view showing the processing-liquid reservation unit according to the fourth embodiment.

FIG. 6 shows another embodiment. Referring to FIG. 6, reference numeral 50 represents a door-position detection means, such as a limit switch, for detecting the position of the door 22 and transmitting a detection signal. Reference numeral 51 represents a projection formed on the door 22.

Figure 7:
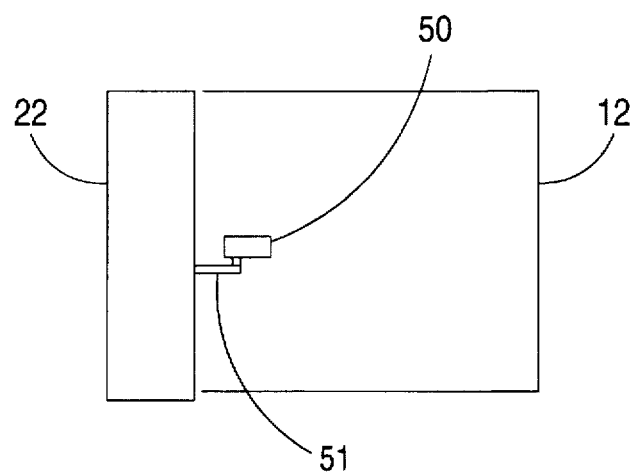
FIG. 7 is a side view showing the processing-liquid reservation unit according to the fourth embodiment.

FIG. 7 is a right-hand side view of FIG. 6. The position of the door 22 shown in FIGS. 6 and 7 is a position at which the opening portion 20 of the processing tank 12 is closed.

When the door 22 has been moved to the position shown in FIGS. 6 and 7, the detection means 50 detects the contact with the projection 51. Control is performed in such a manner that, only when the detection has been performed, the fluid is supplied to the tubular elastic member 30. As a result of the control above, the expansion of the tubular elastic member 30 is performed at only an intended position at which the door 22 closes the opening portion 20 of the processing tank 12. Therefore, the expanded tubular elastic member 30 can be, without exception, brought into contact with the contact surface provided for the door 22. Thus, hermetic closing of the processing tank 12 and the door 22 due to the expansion of the tubular elastic member 30 can be made to be reliable. In a case where a projection or the like exists at a position except the contact surface provided for the door 22 with which the tubular elastic member 30 is brought into contact, the control performed in such a manner that the tubular elastic member 30 is expanded at only a position at which it is brought into contact with the contact surface of the door 22 is able to protect the tubular elastic member from being damaged due to the foregoing projection.

Note that the operation for reserving the processing liquid 18 is performed similarly to that performed in Embodiment 1.

(Embodiment 5)

Figure 8:
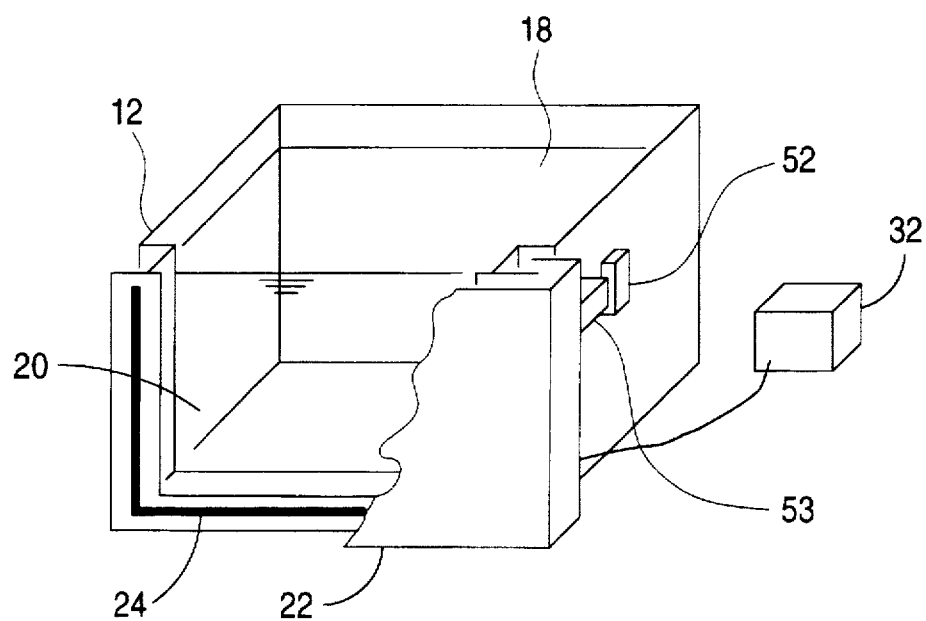
FIG. 8 is a perspective view showing the processing-liquid reservation unit according to the fifth embodiment.

FIG. 8 shows another embodiment. Referring to FIG. 8, reference numeral 52 represents an expansion detection means, such as a limit switch, for detecting expansion of the tubular elastic member 30 and transmitting a detection signal. Reference numeral 53 represents a projection provided for the door 22.

Figure 9:
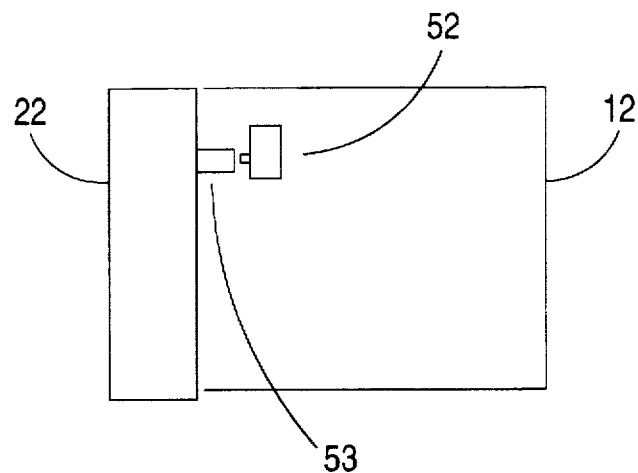
FIG. 9 is a side view showing the processing-liquid reservation unit according to the fifth embodiment.

FIG. 9 is a right-hand side view of FIG. 8.

When the tubular elastic member 30 has been expanded, the door 22 is pushed in a direction toward the processing tank (to the right when viewed in FIG. 9). Thus, the detection means 52 detects the contact with the projection 53. The control is performed such that only when the detection has been performed, the processing tank 12 is filled with the processing liquid 18. As a result of the control above, a problem can be prevented which takes place such that the processing liquid 18 is supplied though the hermetic closing between the processing tank 12 and the door 22 is incomplete and, thus the processing liquid 18 leaks to the outside of the processing tank.

Note that the operation for reserving the processing liquid 18 is performed similarly to that performed in Embodiment 1.

(Embodiment 6)

Figure 10:
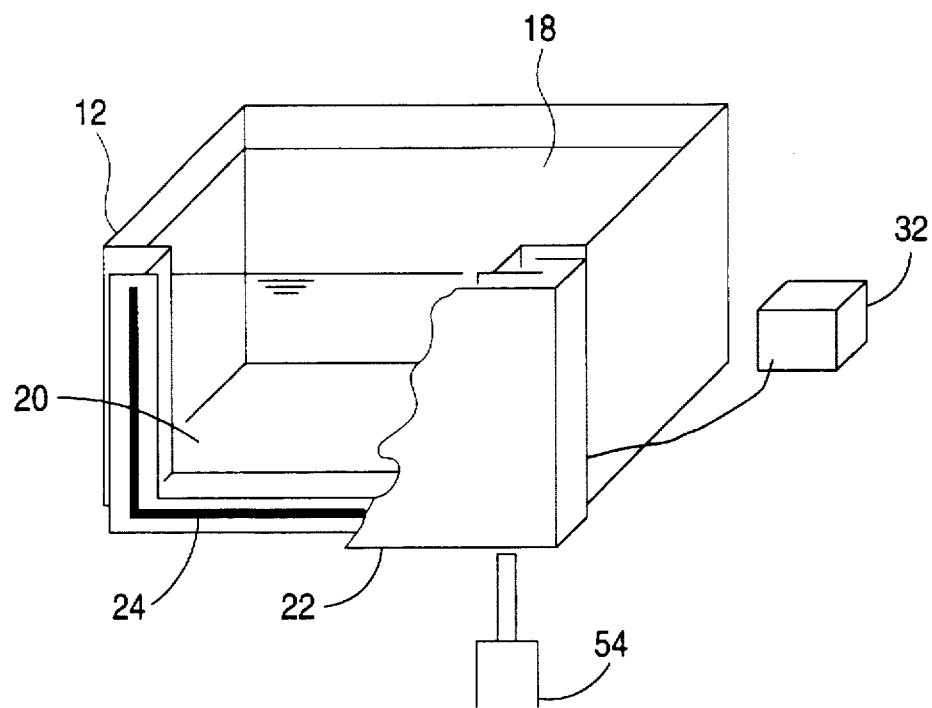
FIG. 10 is a perspective view showing the processing-liquid reservation unit according to the sixth embodiment.

FIG. 10 shows another embodiment. Referring to FIG. 10, reference numeral 54 represents a drive means for automatically opening/closing the door 22.

In a case where the opening portion 20 of the processing tank 12 is closed by the door 22, the door 22 is, by the drive means 54, moved to a position at which the opening portion 20 is closed. After the movement has been completed, the tubular elastic member 30 is filled with the fluid to hermetically close the processing tank 12 and the door 22. In a case where the opening portion 20 is opened, the fluid is discharged from the tubular elastic member 30. After the discharge has been completed, the door 22 is, by the drive means 54, moved to the position at which the opening portion 20 is opened.

By automating the operation for opening/closing the door 22 by means of the drive means 54 and by injecting and discharging the fluid to and from the tubular elastic member 30 when the door 22 is opened or closed as described above, also the operation for hermetically closing the processing tank 12 and the door 22 can be automated.

(Embodiment 7)

Figure 11:
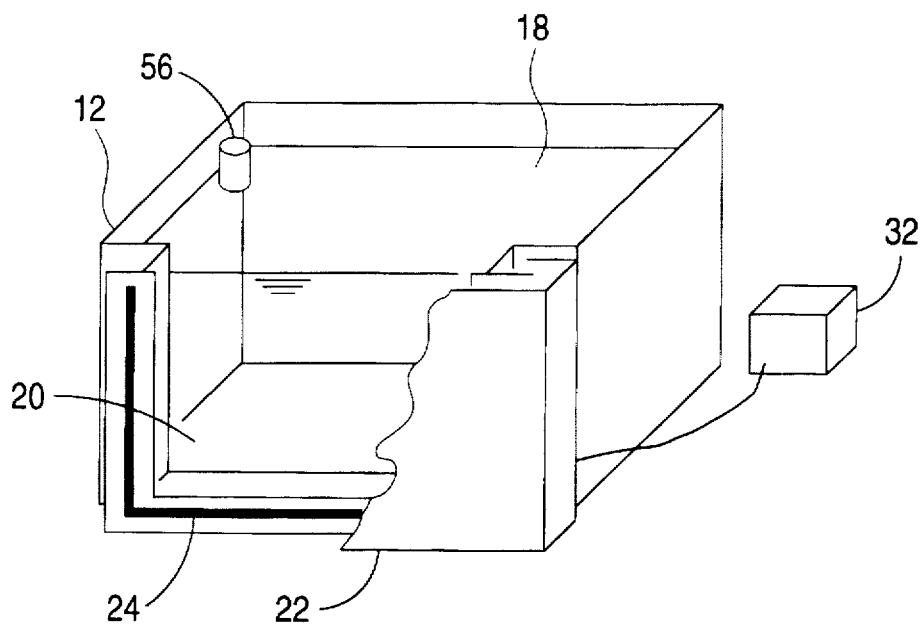
FIG. 11 is a perspective view showing the processing-liquid reservation unit according to the seventh embodiment.

FIG. 11 shows another embodiment. Referring to FIG. 11, reference numeral 56 represents a liquid-level detection means, such as a float switch, for detecting whether the processing liquid 18 exists in the processing tank 12 and transmitting a detection signal.

The detection means 56 detects whether the processing liquid 18 exists. Control is performed in such a manner that, in a case where the processing liquid 18 exists, the fluid filled in the tubular elastic member 30 cannot be discharged. As a result of the control above, the door 22 cannot be opened in a case where the processing liquid 18 is reserved in the processing tank. Therefore, an error can be prevented which occurs such that the door is opened though the processing liquid 18 is reserved in the processing tank and, therefore, the processing liquid 18 is allowed to leak.

Note that the operation for reserving the processing liquid 18 is performed similarly to that performed in Embodiment 1.

(Embodiment 8)

Figure 12:
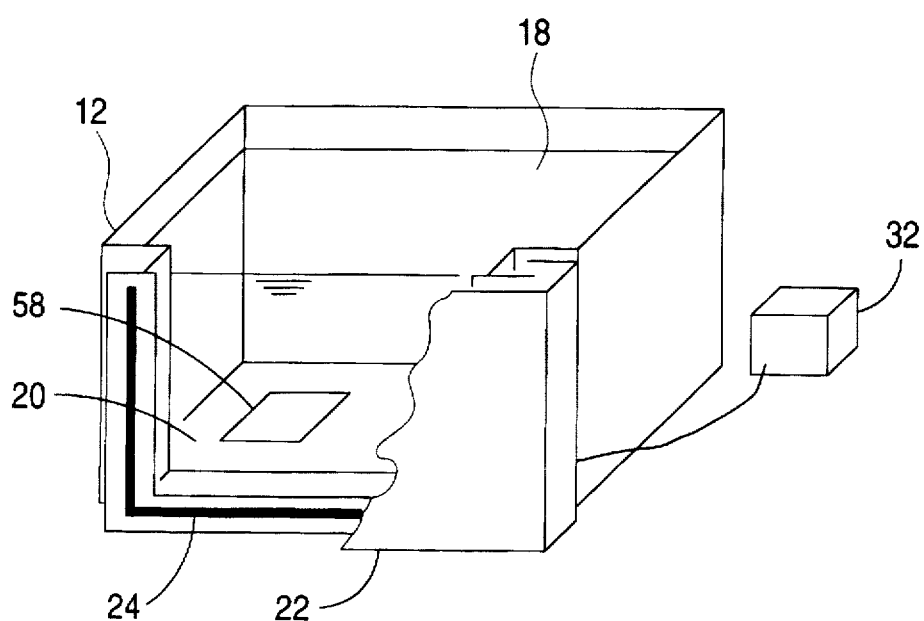
FIG. 12 is a perspective view showing the processing-liquid reservation unit according to the eighth embodiment.

FIG. 12 shows another embodiment. Referring to FIG. 12, reference numeral 58 represents a discharge means for discharging the processing liquid 18 reserved in the processing tank.

If interruption of the supply of electric power takes place during reservation of the processing liquid, control is performed such that the processing liquid 18 in the processing tank is discharged by the discharge means 58. As a result of the control above, leakage of the processing liquid 18 can be prevented even if the hermetic closing between the processing tank and the door is loosened due to the influence of the interruption of the power supply.

(Embodiment 9)

Figure 13:
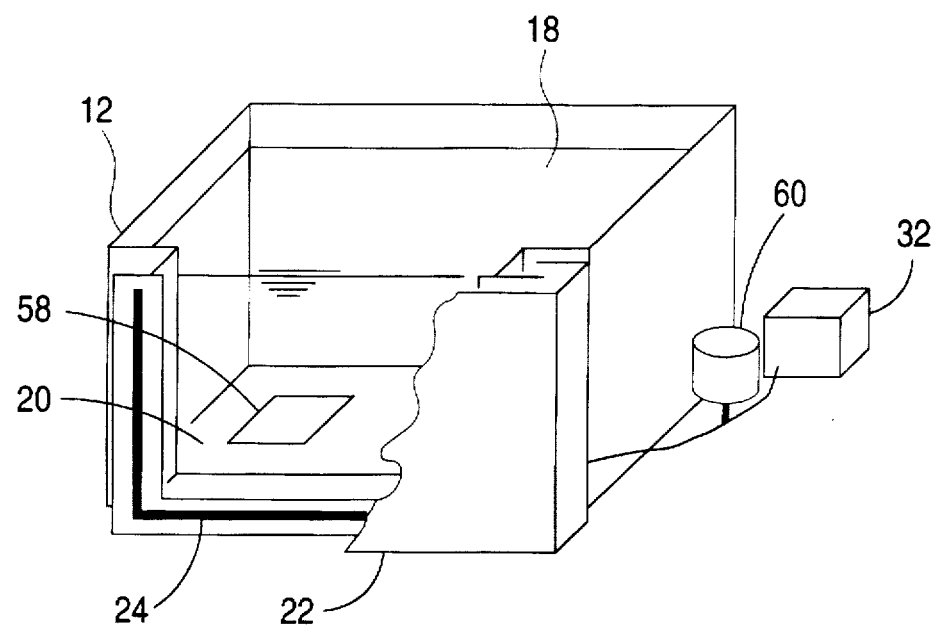
FIG. 13 is a perspective view showing the processing-liquid reservation unit according to the ninth embodiment.

FIG. 13 shows another embodiment. Referring to FIG. 13, reference numeral 60 represents a pressure detection means for detecting the pressure of the fluid and transmitting a detection signal.

The detection means 60 detects the pressure of the fluid to be supplied to the tubular elastic member 30. Control is performed such that the processing liquid 18 in the processing tank is discharged by the discharge means 58 if the pressure is lower than a certain level.

Although the foregoing embodiment has the structure such that the tubular elastic member 30 is attached to the processing tank 12, a similar effect can by obtained if the tubular elastic member 30 is attached to the door 22.

(Embodiment 10)

Figure 14:
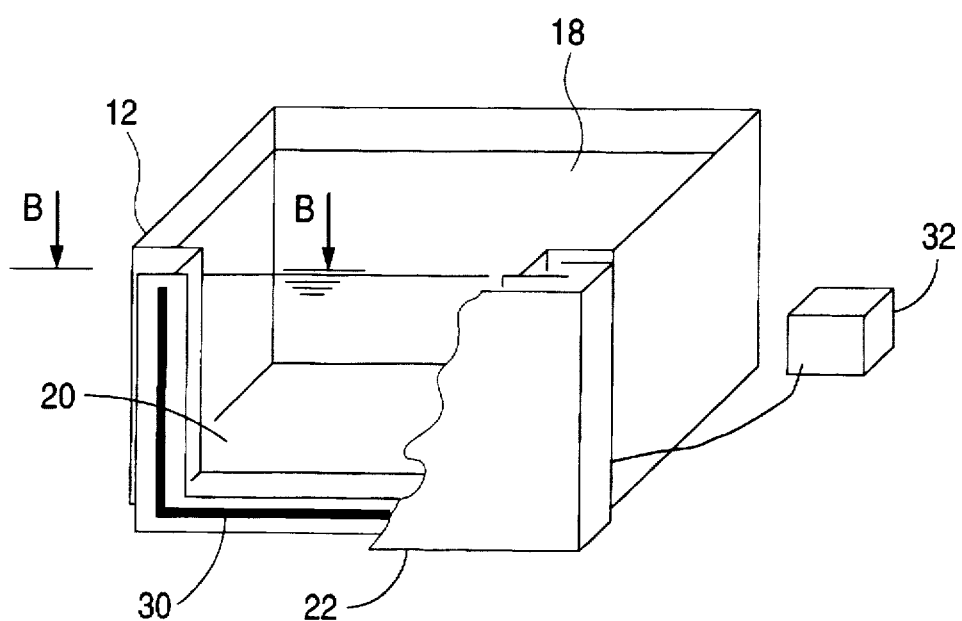
FIG. 14 is a perspective view showing the processing-liquid reservation unit according to the tenth embodiment.
Figure 15:
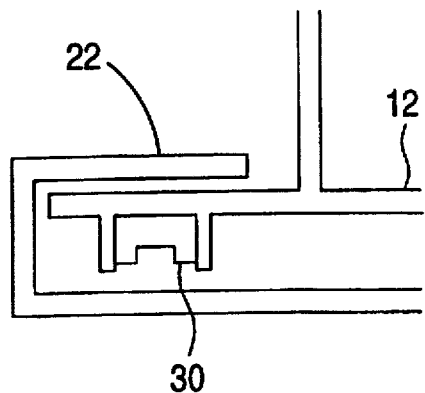
FIG. 15 is a cross sectional view showing the processing-liquid reservation unit according to the tenth embodiment.
Figure 16:
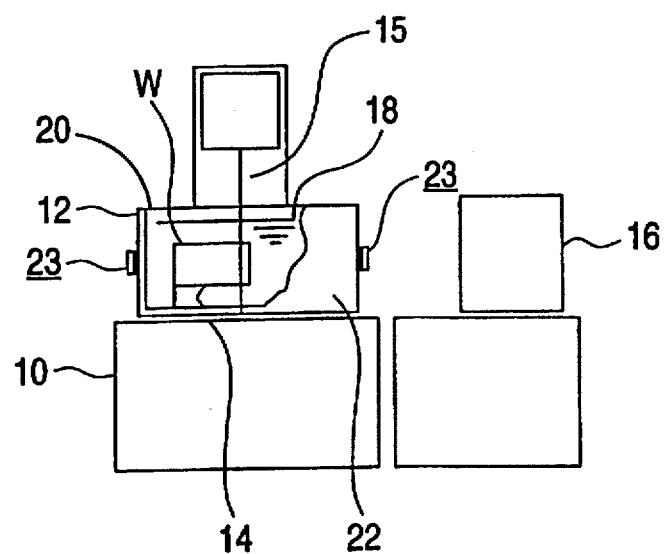
FIG. 16 is a front view showing the shape of the conventional discharge processing apparatus.
Figure 17:
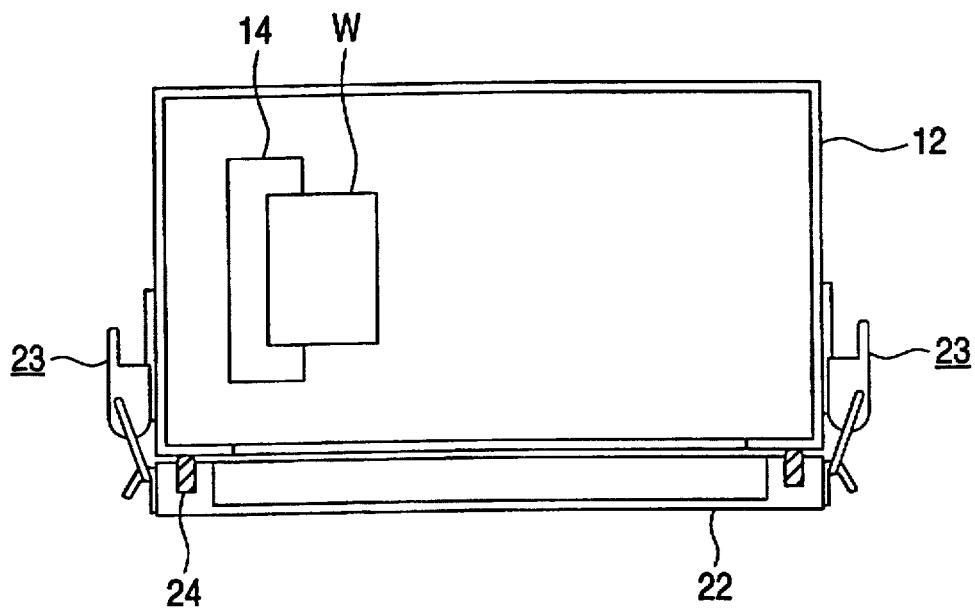
FIG. 17 is a plan view showing the conventional processing-liquid reservation unit.

FIG. 14 is a perspective view showing another embodiment. FIG. 15 is a cross sectional view taken along line B—B shown in FIG. 14. Referring to FIGS. 14 and 15, the tubular elastic member 30 is attached to the front surface of the processing tank 12 in such a manner that it expands toward the forward direction of the processing tank. Since the tubular elastic member 30 also serves as a seal for preventing leakage of the processing liquid 18 in this case, the sealing member 24 according to Embodiments 1 to 8 can be omitted. Note that the operation and effect of this embodiment are similar to those obtainable from Embodiment 1.

Although Embodiments 1 to 10 have the structure such that the tubular elastic member 30 is attached to the processing tank 12, a similar effect can be obtained if the tubular elastic member 30 is attached to the door 22.

Since the present invention is structured as described above, the following effects can be attained.

The processing-liquid reservation unit of the discharge processing apparatus according to the first aspect of the present invention has the structure such that the processing-liquid reservation unit of the discharge processing apparatus which reserves processing liquid supplied from the processing-liquid supply unit and generates, in the processing liquid, a discharge in the small gap between the electrode and a work piece to be processed so as to process the work piece, comprises: the processing tank having the opening portion; the door for opening/closing the opening portion of the processing tank; the tubular elastic member for sealing the space between the door and the opening portion of the processing tank in a state where the door is closed; and the fluid control unit for filling the tubular elastic member with fluid and discharging the same from the tubular elastic member. Therefore, the sealing properties between the processing tank and the door can be controlled with the fluid pressure in the tubular elastic member. Thus, addition of concentrated load to the processing tank and the door can be prevented. Moreover, the rigidity of the processing tank and the door can be weakened.

The processing-liquid reservation unit of the discharge processing apparatus according to the second aspect of the present invention has the structure such that the processing-liquid reservation unit of the discharge processing apparatus according to the first aspect has the arrangement such that the tubular elastic member is disposed to cause the door to press against the processing tank when the tubular elastic member is filled with the fluid and thus expanded. Therefore, the other sealing member between the processing tank and the door is uniformly compressed over the opening portion. Therefore, the property for sealing the opening portion of the processing tank can be improved.

The processing-liquid reservation unit for a discharge processing apparatus according to the third aspect of the present invention has the structure such that the processing-liquid reservation unit of the discharge processing apparatus according to the second aspect has the arrangement such that the fluid control unit has the check valve, the filling circuit capable of filling the tubular elastic member with the fluid only when electric power is supplied and the discharge circuit capable of discharging the fluid to the outside of the tubular elastic member only when electric power is supplied. Therefore, the fluid is allowed to flow in the filling circuit and, therefore, it cannot be discharged from the tubular elastic member. If an unintentional situation, such as interruption of supply of power, takes place, leakage of the fluid from the tubular elastic member can be prevented even in a period in which the processing liquid is reserved. Thus, leakage of the processing liquid can be prevented.

The processing-liquid reservation unit for a discharge processing apparatus according to the fourth aspect of the present invention has the structure such that the processing-liquid reservation unit of the discharge processing apparatus according to any one of the first to third aspects has the arrangement such that the door-position detection means is provided which detects the position of the door to transmit a detection signal so that the fluid control unit is controlled in response to the detection signal. Therefore, the control can be performed such that the expansion of the tubular elastic member is inhibited until the door is brought to the intended position when the door is closed. Thus, incomplete closing between the processing tank and the door can be prevented.

The processing-liquid reservation unit of the discharge processing apparatus according to the fifth aspect of the present invention has the structure such that the processing-liquid reservation unit of the discharge processing apparatus according to any one of the first to third aspects has the arrangement such that the state-detection means is provided which detects a state of expansion or state of compression of the tubular elastic member to transmit a detection signal so that the processing-liquid supply unit is controlled in response to the detection signal. Therefore, the control can be performed such that supply of the processing liquid to the processing tank is inhibited in a state where the tubular elastic member is not expanded. Therefore, an error can be prevented which takes place such that the processing liquid is supplied in a state where the processing tank and the door are not completely closed.

The processing-liquid reservation unit of the discharge processing apparatus according to the sixth aspect of the present invention has the structure such that the processing-liquid reservation unit of the discharge processing apparatus according to any one of the first to third aspects has the arrangement such that the drive means for automatically opening/closing the door is provided so that the tubular elastic member is expanded or compressed when the processing tank is opened or closed so that the opening portion of the processing tank is operated. Therefore, the door is hermetically closed and maintained by a simple operation of the expansion and compression of the tubular elastic member. Therefore, an effect can be attained in that the automatization of the operation for opening/closing the door can easily be realized.

The processing-liquid reservation unit for a discharge processing apparatus according to the seventh aspect of the present invention has the structure such that the processing-liquid reservation unit for a discharge processing apparatus according to any one of the first to third aspects has the arrangement such that the liquid-level detection means is provided which detects whether or not the processing liquid exists in the processing tank, and in a case where the liquid-level detection means has determined that the processing liquid exists in the processing tank, the fluid cannot be discharged from the tubular elastic member. Therefore, the control can be performed such that opening of the processing tank is inhibited in a case where the processing liquid exists in the processing tank. Thus, an effect can be attained such that an error performed by an operator such that the processing liquid in the processing tank is allowed to leak or an error in the operation in the case where opening/closing of the door is automated can be prevented.

The processing-liquid reservation unit for a discharge processing apparatus according to the eighth aspect of the present invention has the structure such that the processing-liquid reservation unit for a discharge processing apparatus according to any one of the first to third aspects has the arrangement such that the discharge means for discharging the processing liquid in the processing tank is provided and the discharge means is operated when the power supply has been interrupted. Therefore, if the fluid has leaked from the tubular elastic member due to an unintentional situation, the processing liquid in the processing tank is discharged. Therefore, an effect can be attained in that leakage of the processing liquid can be prevented.

The processing-liquid reservation unit for a discharge processing apparatus according to the ninth aspect of the present invention has the structure such that the processing-liquid reservation unit for a discharge processing apparatus according to the eighth aspect has the arrangement such that the pressure detection means is provided which detects the pressure of the fluid in the tubular elastic member and in a case where the pressure of the fluid in the tubular elastic member detected by the pressure detection means is lower than a certain level, the discharge means for discharging the processing liquid in the processing tank is operated. Thus, if interruption of power supply takes place, the processing liquid in the processing tank is discharged. Therefore, an effect can be attained in that leakage of the processing liquid can be prevented.

What is claimed is:

1. A processing-liquid reservation unit for a discharge processing apparatus which reserves processing liquid supplied from a processing-liquid supply unit and generates, in said processing liquid, a discharge in a small gap between an electrode and a work piece to be processed so as to process said work piece, said processing-liquid reservation unit for a discharge processing apparatus comprising:

a processing tank having an opening portion;

a door for opening/closing said opening portion of said processing tank;

a tubular elastic member for sealing a space between said door and said opening portion of said processing tank in a state where said door is closed; and a fluid control unit for filling said tubular elastic member with fluid and discharging the same from said tubular elastic member.

2. The processing-liquid reservation unit for a discharge processing apparatus of claim 1, wherein said tubular elastic member is disposed to cause said door to press against said processing tank, when said tubular elastic member is filled with the fluid and thus expanded.

3. The processing-liquid reservation unit for a discharge processing apparatus of claim 2, further comprising:

door-position detection means which detects the position of said door to transmit a detection signal so that said fluid control unit is controlled in response to said detection signal.

4. The processing-liquid reservation unit for a discharge processing apparatus of claim 2, further comprising:

state-detection means which detects a state of expansion or state of compression of said tubular elastic member to transmit a detection signal so that said processing-liquid supply unit is controlled in response to said detection signal.

5. The processing-liquid reservation unit for a discharge processing apparatus of claim 2, further comprising:

drive means for automatically opening/closing said door so as to expand or compress said tubular elastic member, when said processing tank is opened or closed so that said opening portion of said processing tank is operated.

6. The processing-liquid reservation unit for a discharge processing apparatus of claim 2, further comprising:

liquid-level detection means which detects whether or not the processing liquid exists in said processing tank, wherein in a case where said liquid-level detection means has determined that the processing liquid exists in said processing tank, the fluid cannot be discharged from said tubular elastic member.

7. The processing-liquid reservation unit for a discharge processing apparatus of claim 2, further comprising:

discharge means for discharging the processing liquid in said processing tank, said discharge means being operated when the power supply has been interrupted.

8. The processing-liquid reservation unit for a discharge processing apparatus of claim 7, further comprising:

pressure detection means which detects the pressure of the fluid in said tubular elastic member, wherein in a case where the pressure of said fluid in said tubular elastic member detected by said pressure detection means is lower than a certain level, said discharge means for discharging the processing liquid in said processing tank is operated.

9. The processing-liquid reservation unit for a discharge processing apparatus of claim 1, wherein said fluid control unit includes:

a check valve, a filling circuit capable of filling said tubular elastic member with the fluid only when electric power is supplied, and a discharge circuit capable of discharging the fluid to the outside of said tubular elastic member only when electric power is supplied.

10. The processing-liquid reservation unit for a discharge processing apparatus of claim 9, further comprising:

door-position detection means which detects the position of said door to transmit a detection signal so that said fluid control unit is controlled in response to said detection signal.

11. The processing-liquid reservation unit for a discharge processing apparatus of claim 9, further comprising:

state-detection means which detects a state of expansion or state of compression of said tubular elastic member to transmit a detection signal so that said processing-liquid supply unit is controlled in response to said detection signal.

12. The processing-liquid reservation unit for a discharge processing apparatus of claim 9, further comprising:

drive means for automatically opening/closing said door so as to expand or compress said tubular elastic member, when said processing tank is opened or closed so that said opening portion of said processing tank is operated.

13. The processing-liquid reservation unit for a discharge processing apparatus of claim 9, further comprising:

liquid-level detection means which detects whether or not the processing liquid exists in said processing tank, wherein in a case where said liquid-level detection means has determined that the processing liquid exists in said processing tank, the fluid cannot be discharged from said tubular elastic member.

14. The processing-liquid reservation unit for a discharge processing apparatus of claim 9, further comprising:

discharge means for discharging the processing liquid in said processing tank, said discharge means being operated when the power supply has been interrupted.

15. The processing-liquid reservation unit for a discharge processing apparatus of claim 14, further comprising:

pressure detection means which detects the pressure of the fluid in said tubular elastic member, wherein in a case where the pressure of said fluid in said tubular elastic member detected by said pressure detection means is lower than a certain level, said discharge means for discharging the processing liquid in said processing tank is operated.

16. The processing-liquid reservation unit for a discharge processing apparatus of claim 1, further comprising:

door-position detection means which detects the position of said door to transmit a detection signal so that said fluid control unit is controlled in response to said detection signal.

17. The processing-liquid reservation unit for a discharge processing apparatus of claim 1, further comprising:

state-detection means which detects a state of expansion or state of compression of said tubular elastic member to transmit a detection signal so that said processing-liquid supply unit is controlled in response to said detection signal.

18. The processing-liquid reservation unit for a discharge processing apparatus of claim 1, further comprising:

drive means for automatically opening/closing said door so as to expand or compress said tubular elastic member, when said processing tank is opened or closed so that said opening portion of said processing tank is operated.

19. The processing-liquid reservation unit for a discharge processing apparatus of claim 1, further comprising:

liquid-level detection means which detects whether or not the processing liquid exists in said processing tank, wherein in a case where said liquid-level detection means has determined that the processing liquid exists in said processing tank, the fluid cannot be discharged from said tubular elastic member.

20. The processing-liquid reservation unit for a discharge processing apparatus of claim 1, further comprising:

discharge means for discharging the processing liquid in said processing tank, said discharge means being operated when the power supply has been interrupted.

21. The processing-liquid reservation unit for a discharge processing apparatus of claim 20, further comprising:

pressure detection means which detects the pressure of the fluid in said tubular elastic member, wherein in a case where the pressure of said fluid in said tubular elastic member detected by said pressure detection means is lower than a certain level, said discharge means for discharging the processing liquid in said processing tank is operated.

\* \* \* \* \*